United States Patent
Calise et al.

(10) Patent No.: US 6,757,570 B1
(45) Date of Patent: *Jun. 29, 2004

(54) SYSTEM AND METHOD FOR ADAPTIVE CONTROL OF UNCERTAIN NONLINEAR PROCESSES

(75) Inventors: Anthony J. Calise, Atlanta, GA (US); Byoung-Soo Kim, Taejon (KR); J. Eric Corban, McDonough, GA (US)

(73) Assignee: Guided Systems Technologies, Inc., McDonough, GA (US)

( * ) Notice: Subject to any disclaimer, the term of this patent is extended or adjusted under 35 U.S.C. 154(b) by 213 days.

This patent is subject to a terminal disclaimer.

(21) Appl. No.: 09/585,105

(22) Filed: May 31, 2000

Related U.S. Application Data (63) Continuation-in-part of application No. 08/510,055, filed on Aug. 1, 1995, now Pat. No. 6,092,919.

(51) Int. Cl.[7] .............................................. G05B 13/02
(52) U.S. Cl. ............................ 700/45; 700/28; 700/29; 700/48; 706/14
(58) Field of Search ............................. 700/28, 29, 31, 700/45, 48, 54, 1, 8, 41–44, 47; 244/75 R; 706/10, 14–15, 21, 23

(56) References Cited

U.S. PATENT DOCUMENTS

| | | | | |
|---|---|---|---|---|
| 5,268,834 A | * | 12/1993 | Sanner et al. .................. | 700/31 |
| 5,311,421 A | * | 5/1994 | Nomura et al. ................ | 700/37 |
| 5,394,322 A | * | 2/1995 | Hansen ......................... | 700/37 |
| 5,396,415 A | * | 3/1995 | Konar et al. .................. | 700/42 |
| 5,486,996 A | * | 1/1996 | Samad et al. .................. | 700/32 |
| 5,570,282 A | * | 10/1996 | Hansen et al. ................. | 700/41 |
| 5,625,552 A | * | 4/1997 | Mathur et al. ................. | 700/42 |
| 5,706,193 A | * | 1/1998 | Linzenkirchner ............. | 700/42 |
| 5,719,480 A | * | 2/1998 | Bock et al. ............. | 318/568.11 |
| 6,078,843 A | * | 6/2000 | Shavit ........................... | 700/48 |
| 6,092,919 A | * | 7/2000 | Calise et al. .................. | 700/45 |

* cited by examiner

Primary Examiner—William Grant
Assistant Examiner—Ronald D Hartman, Jr.
(74) Attorney, Agent, or Firm—Alston & Bird LLP (57) ABSTRACT

A process and neural network architecture for on-line adjustment of the weights of the neural network in a manner that corrects errors made by a nonlinear controller designed based on a model for the dynamics of a process under control. A computer system is provided for controlling the dynamic output response signal of a nonlinear physical process, where the physical process is represented by a fixed model of the process. The computer system includes a controlled device for responding to the output response signal of the system. The computer system also includes a linear controller for providing a pseudo control signal that is based on the fixed model for the process and provides a second controller, connected to the linear controller, for receiving the pseudo control signal and for providing a modified pseudo control signal to correct for the errors made in modeling the nonlinearities in the process. A response network is also included as part of the computer system. The response network receives the modified pseudo control signal and provides the output response signal to the controlled device. The second controller preferably is a neural network. The computer system may include a plurality of neural networks with each neural network designated to control a selected variable or degree of freedom within the system.

17 Claims, 10 Drawing Sheets

SYSTEM AND METHOD FOR ADAPTIVE CONTROL OF UNCERTAIN NONLINEAR PROCESSES

CROSS-REFERENCE TO RELATED APPLICATIONS

This continuation-in-part application claims priority benefits under 35 U.S.C. §120 and 37 C.F.R. §1.53(b) to U.S. patent application Ser. No. 08/510,055 filed Aug. 1, 1995 now U.S. Pat. No. 6,092,919 naming as inventors Anthony J. Calise and Byoung-Soo Kim.

GOVERNMENT LICENSE RIGHTS

The U.S. Government has a paid-up license in the invention and the right in limited circumstances to require the patent owner to license others on reasonable terms as provided for by the terms of a contract awarded by the Department of the Army, Army Research Office.

FIELD OF THE INVENTION

The present invention generally relates to control systems for dynamic processes and, particularly, relates to adaptive control systems for minimizing errors in output control signals of uncertain nonlinear processes.

BACKGROUND OF THE INVENTION

Many control or pattern recognition computer systems are created by designing a function to model a selected set of data or statistics. From the modeled set of data, the computer system may control, estimate, correct or identify output data based on the modeled function. Many methods exist for creating functions that model data. Recently, neural networks have been employed to identify or create functional models for various types of systems.

A neural network consists of simple interconnected processing elements. The basic operation of each processing element is the transformation of its input signals to a useful output signal. Each interconnection transmits signals from one element to another element, with a relative effect on the output signal that depends on the weight for the particular interconnection. A neural network may be trained by providing known input values and output values to the network, which causes the interconnection weights to be changed until the desired system is modeled to a specified degree of accuracy or as precisely as reasonably possible.

With statistics software or neural network software, input-output relationships during a training phase are identified or learned, and the learned input-output relationships are applied during a performance phase. For example, during the training phase a neural network adjusts connection weights until known target output values are produced from known input values. During the performance phase, the neural network uses connection weights identified during the training phase to impute unknown output values from known input values. The neural network accuracy depends on data predictability and network structure that is chosen by the system designer, for example, the number of layers and the number of processing elements in each layer.

Because the reliability of a function modeled by a neural network depends on the reliability of data that is used to model a system, large quantities of data are often required to produce a model that satisfies the desired specifications. However, it can be difficult to collect data that represents all possible outcomes of a given system and, thus, a model of the system is created based on a training subset of data from the system from which predictions or corrections can be made. Because system functions based on the model may originate from data that was not contained in the initial training set, the potential for error within the system is increased with respect to the non-modeled input data.

It is desirable to have a system that can adapt and learn to make predictions or corrections based on non modeled input data after the model has been put into action. This adaptive learning may be termed on-line learning. Due to the time that it takes to train a neural network, the use of neural networks have been limited to providing models for predictive systems when the inputs and outputs are known, such as a neural network used in predicting or recognizing a pattern based on selected inputs for which the system was trained. This type of system is not sufficient for producing accurate results in a control system environment where the model has not been trained for all possible outcomes or where nonlinearities or sudden changes may be introduced to the system under control. This is particularly true for the control of processes described by nonlinear differential equations of motion. It is well known by practitioners in the art that certain systems are difficult to control, such as systems in which the defining equations of motion for the process to be controlled are poorly known with respect to their functional forms, or in which the functional forms themselves may undergo sudden and unexpected variation, particularly when the effect of the control action enters nonlinearly. Thus, in nonlinear systems, neural networks trained off-line will not produce results that minimize the error of the control system based on data received on-line.

Because of the limitations in existing methods for training neural networks, and the general lack of a proof of stability in control applications in which the control enters nonlinearly, a technique which provides rapid on-line learning, and that insures stability for real time applications is highly desirable. Such a technique would have applicability in the field of flight control of either manned or unmanned aerial vehicles. For such applications, the dynamics are highly nonlinear and can undergo variations due to transitions in flight conditions, initiation of highly dynamic maneuvers involving large state excursions from trim flight conditions, or due to failures in actuators or due to damage to the airframe.

A number of airframes for modern aircraft, particularly high speed military fighter aircraft, are inherently unstable, and require sophisticated control electronics to translate pilot control inputs into appropriate signals to actuate control devices. Problems in the design of such control systems arise from the fact that very complex nonlinear relationships describe the physical behavior of the aircraft. The relations vary in a complex way with aircraft speed, altitude, and angle of attack. The control system is, in many respects, only as good as the model of the nonlinear physical system upon which the controller is based. Therefore, any system that can adaptively learn to correct for defects in the modeling process can provide improved stability in aircraft control systems.

Such a system is usable not only in the control of high speed military aircraft, but also for the control of other aircraft, such as helicopters. In particular, the system of the present invention is contemplated as useful in both control of high speed unstable aircraft and useful in the control of remotely controlled unmanned helicopter vehicles.

Thus, there is a need in the art for an adaptive control system that insures both the capability for real-time, on-line learning and stability of the controlled process and that has an architecture that enables adaptation to processes in which the effect of the control action on the dynamics of the system is nonlinear.

SUMMARY OF THE INVENTION

Generally described, the present invention provides a process and neural network architecture for on-line adjustment of the weights of the neural network in a manner that corrects errors made by a nonlinear controller designed based on a model for the dynamics of a process under control.

More particularly described, the present invention provides a computer system for controlling the dynamic output response signal of a nonlinear physical process, where the physical process is represented by a fixed model of the process. The computer system includes a controlled device for responding to the output response signal of the system. The computer system also includes a linear controller for providing a pseudo control signal that is based on the fixed model for the process and provides a second controller, connected to the linear controller, for receiving the pseudo control signal and for providing a modified pseudo control signal to correct for the errors made in modeling the non-linearities in the process. A response network is also included as part of the computer system. The response network receives the modified pseudo control signal and provides the output response signal to the controlled device.

The second controller preferably is a neural network. The computer system may include a plurality of neural networks with each neural network designated to control a selected variable or degree of freedom within the system.

The present invention may be implemented as an improvement to flight control systems. In a flight control computer system designed for a set of flight dynamics of a particular aircraft, the flight control system implementing a command augmentation system, the command augmentation system comprising: an attitude control for providing a pseudo control signal used in determining a selected control signal for controlling an action of the aircraft; and an output control unit, connected to receive input from the attitude control, for generating the selected control signal based on the pseudo control signal, the present invention provides the following improvement: a neural network connected between the attitude control and the output control for modifying the pseudo control signal based on data received during the flight of the aircraft to correct for errors made in modeling the nonlinearities in the flight dynamics of the aircraft.

Thus, it is an object of the present invention to use neural networks for learning and controlling on-line control processes.

It is another object of the present invention to provide an on-line adaptive control to correct errors made by a controller.

It is another object of the present invention to provide an adaptive controller that quickly adapts and corrects system processes although a crude model for the dynamics of a system were initially given.

It is another object of the present invention to provide an improved adaptive controller that is particularly useful in a control system for an inherently unstable airframe.

It is still a further object of the present invention to provide an adaptive controller particularly useful in a flight controller for remotely controlled aircraft, including unmanned helicopter vehicles.

These and other objects, features, and advantages of the present invention will become apparent from reading the following description in conjunction with the accompanying drawings.

DETAILED DESCRIPTION

Figure 1:
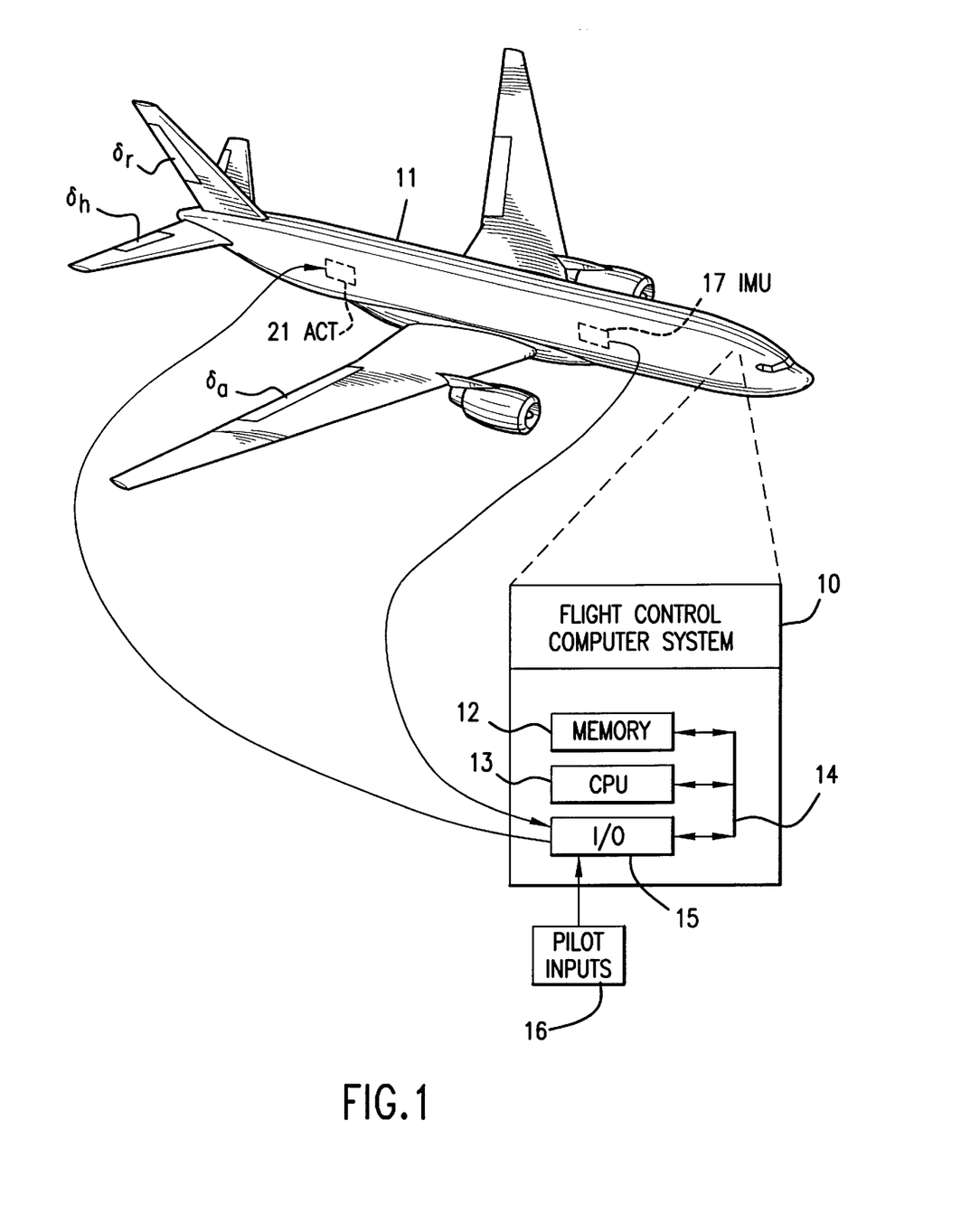
FIG. 1 shows an aircraft with a flight control system embodying the present invention.

Referring to FIG. 1, a flight control computer system embodying the present invention is shown implemented in an aircraft 11. The present invention is directed to a system and method for a control system that may be utilized to minimize errors that may arise in a modeled control system due to nonlinearities in the modeled system. The flight control computer system 10 is one such control system that operates with nonlinear input variables. It should be appreciated that the flight control computer system 10 is located within the aircraft 11 and is shown in exploded view for the purpose of illustration. Basic hardware components of the flight control computer system 10 are illustrated. For simplicity of the drawings, many components of a standard computer system have not been illustrated such as address buffers, memory buffers and other standard control circuits because these elements are well known and illustrated in the prior art and are not necessary for the understanding of the present invention. A computer program used to implement the various steps of the present invention is generally located in the memory unit 12, and the processes of the present invention are carried out through the use of a central processing unit (CPU) 13. Those skilled in the art will appreciate that the memory unit 12 is representative of both read-only memory and random access memory. The CPU 13, in combination with computer software, controls the operations of the flight control computer system 10. The system bus 14 supports communications of control, address, and data signals between the CPU 13 and the remaining components of the computer system 10. The memory unit 12 and the CPU 13 are connected by a computer system bus 14 designed to provide an electrical interface between computer system components. The processes implemented by the CPU 13 may be communicated as electrical signals along the computer system bus 14 to an input/output device 15 that serves to control the movement surfaces of the aircraft indicated by 8a, 8h, and 8r. Actuators (ACT) 21 are utilized to aid in the facilitating the movement surfaces. Inputs to the flight control system 10 may include pilot inputs 16 and integrated sensed inputs from an inertial measurement unit (IMU) 17 as known by those skilled in the art.

In this detailed description, numerous details are provided such as sample data, and specific equations, etc., in order to provide an understanding of the invention. However, those skilled in the art will understand that the present invention may be practiced without the specific details. Well-known circuits, programming methodologies, and structures are utilized in the present invention but are not described in detail in order not to obscure the present invention.

For purposes of this discussion, a process or method is generally a sequence of computer-executed steps leading to a desired result. These steps require physical manipulations of physical quantities. Usually, though not necessarily, these quantities take the form of electrical, magnetic, or optical signals that are capable of being stored, transferred, combined, compared, or otherwise manipulated. It is conventional for those skilled in the art to refer to these signals as bits, data, values, elements, symbols, characters, terms, numbers, or the like. Certain portions of the description which follow is presented in terms of equations. It should be appreciated that the operands of the equations are steps of a process that serve to manipulate the terms or characters of the equation to produce electrical signals for generation of input/output signals to control the various instruments and devices used in conjunction with the present invention. Standard notation is used in these equations as readily understood by those skilled in the art. It should be kept in mind, however, that these and similar terms should be associated with appropriate physical quantities inside the computer and that these are merely convenient labels applied to these physical quantities that exist within the computer.

It should also be understood that manipulations within the computer system are often referred to in terms such as adding, subtracting, multiplying, dividing, comparing, moving, etc., which are sometimes associated with mental operations performed by a human operator. It should be understood that involvement of a human operator is not necessary in the present invention because the operations described herein are machine operations performed in conjunction with a human operator or user that interacts with the computer system. The machines used for performing the operation of the present invention include digital computers, circuit boards, digital chips or other similar computing devices known to those skilled in the art.

Although the aircraft 11 is shown as a fixed wing airplane, those skilled in the art will appreciate that the flight control computer system 10 embodying the present invention may be implemented with a helicopter or with unmanned aircraft. The flight control computer system 10 is used to aid a pilot in controlling the aircraft during flight. The flight control computer system 10 is particularly helpful in stabilizing the air frame of the aircraft. Without a stabilization system or a highly accurate stabilization system, the pilot's task of controlling the plane would be more difficult.

Controlling the stabilization of an aircraft requires analyzing multiple variables or degrees of freedom to determine the appropriate control value needed to produce the desired stabilization. The multiple degrees of freedom or variables used in controlling or stabilizing an aircraft affect each other in a nonlinear manner and thus must be operated on accordingly. Generally, modeling errors enter a modeled system when there is a sudden alteration of the process or a failure occurs to a system device, such as failure of an actuator. Creating a nonlinear model to represent the various effects that multiple variables have on each other within a specified system can be difficult when accuracy and response speed are important, as with high performance aircraft. Generally, it is difficult to collect data that represents all possible outcomes of a given system. Thus, a model of the system is created based on a training subset of data from the system from which predictions or corrections can be made. Because system functions based on the model may originate from data that was not contained in the initial training subset, tile potential for error within the system is increased with respect to the non-modeled input data. Thus, it is desirable to have a system that can adapt and learn to make predictions or corrections based on non-modeled input data. This adaptive learning may be termed on-line learning or control.

Traditionally, neural networks are used to create an initial model based on a training subset of data. A model based on an initial training set may be termed an off-line model. Due to the time that it takes to train a neural network, the use of neural networks have been limited to providing models for predictive systems when the inputs and outputs are known, such as a neural network used in predicting or recognizing a pattern based on selected inputs for which the system was trained. This type of system is not sufficient for producing accurate results in a control system environment where the model has not been trained for all possible outcomes. Thus, in nonlinear systems such as aircraft control systems, typical neural networks trained off-line will not produce results that minimize tile error of the control system based on data received on-line. The present invention provides such an adaptive control system that permits on-line adjustments of control parameters to accommodate or correct for data not utilized in an initial training set.

Continuing the discussion of an aircraft flight control, system embodying the present invention, aircraft flight control computer systems must account for multiple nonlinear variables or degrees of freedom. The degrees of freedom relevant to aircraft stabilization consist of three position variables and three attitude variables. Because the three position variables change slowly with respect to the attitude variables, a control system for an aircraft stabilization system can be treated as having only three degrees of freedom (i.e., the attitude variables). Attitude generally refers to the position or orientation of an aircraft, either in motion or at rest, as determined by the relationship between the aircraft's axis and some reference line or plane or some fixed system of reference axes. The attitude variables are given in terms of angles. The attitude angles are generally represented by roll-$\psi$, pitch-$\Theta$, and yaw-$\phi$ in the determination of appropriate control signals in flight control computer systems. The angular rates $\phi$, $\Theta$, and $\psi$ are Euler angular coordinates. However, two types of angular rates are encountered in flight control computer systems. The other types of angles are body angular rates in which roll is represented by $P_c$, pitch is represented by $q_c$ and yaw is represented by $r_c$. The body angular rates are measured rates and are generally transformed to Euler angular rates in a flight control system.

Figure 2:
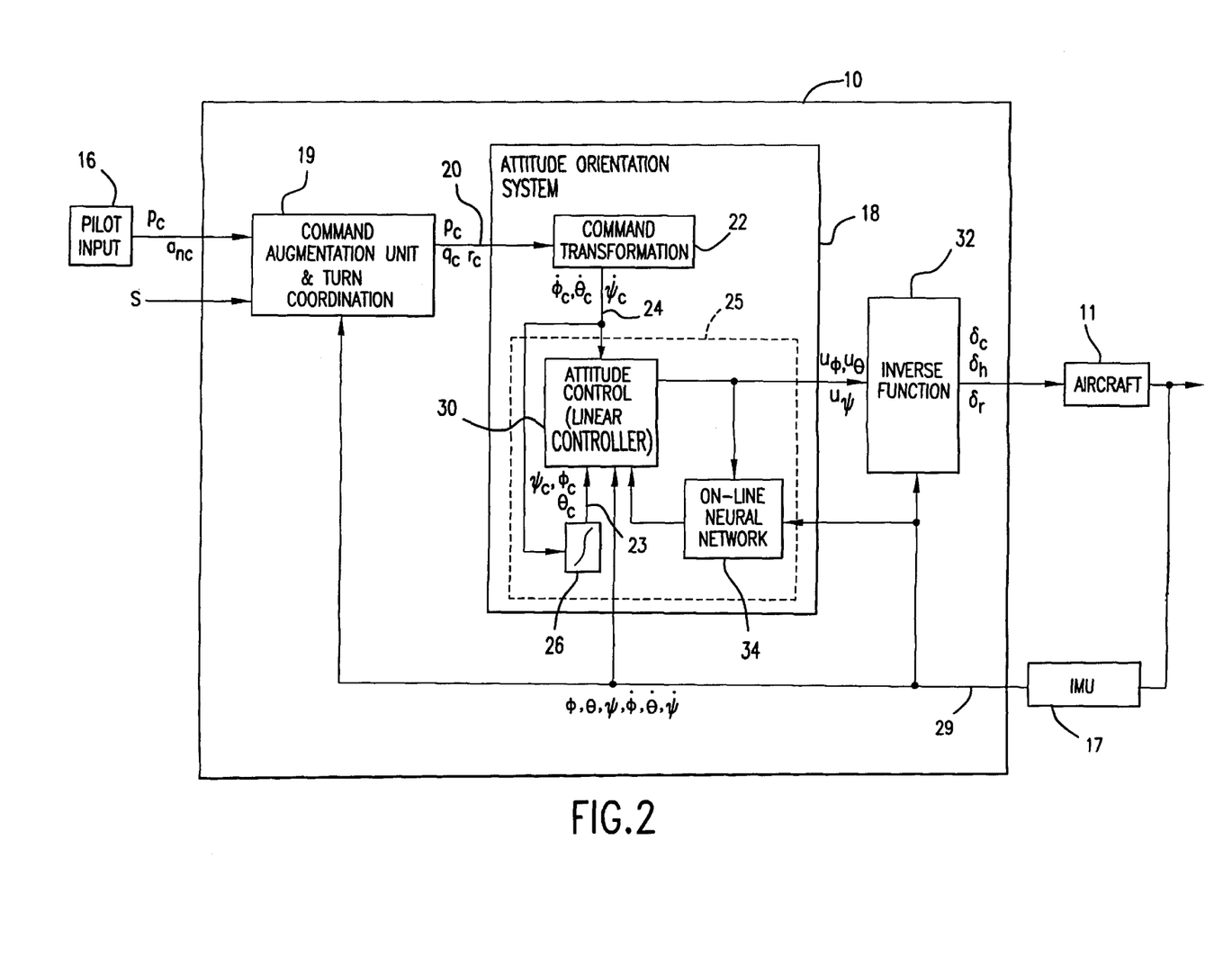
FIG. 2 is a block diagram of a flight control system embodying the present invention.

Referring to FIG. 2, the general operation of a flight control computer system 10, which may be generally termed a command augmentation system (CAS), that implements the present invention will be discussed. The characteristics of flight control systems utilizing a CAS are chosen using aircraft handling specifications that are preferred by human pilots. As noted above, there are many degrees of freedom that have an effect on airplane stability or control. Of these degrees of freedom or controls, the CAS of FIG. 2 is designed to receive a roll rate pc command and a normal acceleration command $a_{nc}$ from the pilot, while the CAS automatically accounts for other commands and degrees of freedom to provide airframe stability. Additionally, a command augmentation unit 19 regulates or maintains a zero angle of side slip S during airplane maneuvers.

The CAS output 20 provides a roll rate pc, which is the pilot's roll rate command as passed through the command augmentation unit 19, a pitch rate $q_c$, which is calculated based on the normal acceleration command $a_{nc}$ and the side slip S, and a yaw rate $r_c$, which is also based upon the normal acceleration $a_{nc}$ and the side slip S. As noted above, these angular rates roll $p_c$, pitch $q_c$, and yaw $r_c$ are body angular rates. In the system shown, the roll $p_c$ is input by a pilot and the pitch $q_c$ and yaw $r_c$ commands are computed quantities. These body angular rates are then passed on to the attitude orientation system 18 to be received at a command transformation system 22. The command transformation system 22 transforms the body angular rates to Euler coordinates which are given as the first derivatives of $\phi_c$, $\theta_c$, and $\Psi_c$ (i.e., the first derivatives of roll, pitch, and yaw, respectively in Euler coordinates). The command transformation output 24 is then passed along to an integrator 26 which outputs the appropriate roll $\phi$, pitch $\theta$, and yaw $\Psi$ coordinates. These coordinates are passed on to an attitude controller 30. In this nonlinear control system, the attitude controller represents the linear portion of an adaptive controller 25.

The adaptive controller 25 includes the attitude controller 30 and a neural network controller 34. The attitude controller 30 in connection with the neural network controller 34 produces pseudo control vectors after $u_\phi$, $u_\Theta$, and $u_\psi$, as discussed in more detail below. The adaptive controller 25 serves to adjust the pseudo control vector on-line. The adaptive controller 25 receives feed back data as indicated by path 29.

A controller or inverse function 32, used in the CAS, consists of a neural network, as discussed in more detail below, that models the initial function for determining the appropriate control signal to provide to the plane's stabilizing system based on off-line training. As noted herein, off-line generally means that the weights defining the neural network used to define the inverse function 32 were determined according to a set of known inputs and known outputs prior to on-line implementation of the flight control system shown in FIG. 2. It should be appreciated that the function for the inverse function 32 can be derived using systems other than neural networks as known by those skilled in the art.

In prior art methods (shown in FIG. 7), the u vector calculated or produced from an attitude controller would be passed on to the neural network controller 32 in order to produce a command based on off-line training data. However, the neural network 34 and its position within the architecture of the system shown in FIG. 2 provide the present invention with the capability of adjusting the u vector based upon actual learned or adjusted values from on-line input data. The neural network 34 thus allows for on-line adjustment of its connection weights which permits the neural network 34 to correct for errors made by the inverting function 32 for which the attitude controller 30 does not account. The inverse function 32 then outputs the appropriate control variable aileron and/or differential tail, δa, elevator, δh, and rudder, δr, for use in stabilizing the aircraft 11. The differential tail δa primarily produces a rolling moment, elevator δh primarily produces a pitching moment, and rudder δr primarily produces a yawing moment. The roll moment corresponding to the differential tail movement is caused by turning or rotating two horizontal parts of the airplane's wing or tail in opposition to one another. The elevator or pitch movement of the plane is adjusted by moving the left and right tail surfaces synchronously in the same direction to cause a plane to either elevate or de-elevate. The yaw moment corresponding to rudder movement is caused by movement of the vertical surface on the tail to the left or right. These foregoing moments may also be accomplished by using synthetic jets, a technology known to those skilled in the art. By implementing the neural network 34 to learn nonlinear functions that were not accounted in an initial training set used for developing a model of the control system, the magnitude of error and the speed at which errors are reduced for control signals, such as δa, δh, or δr, are improved over prior control systems.

Figure 3:
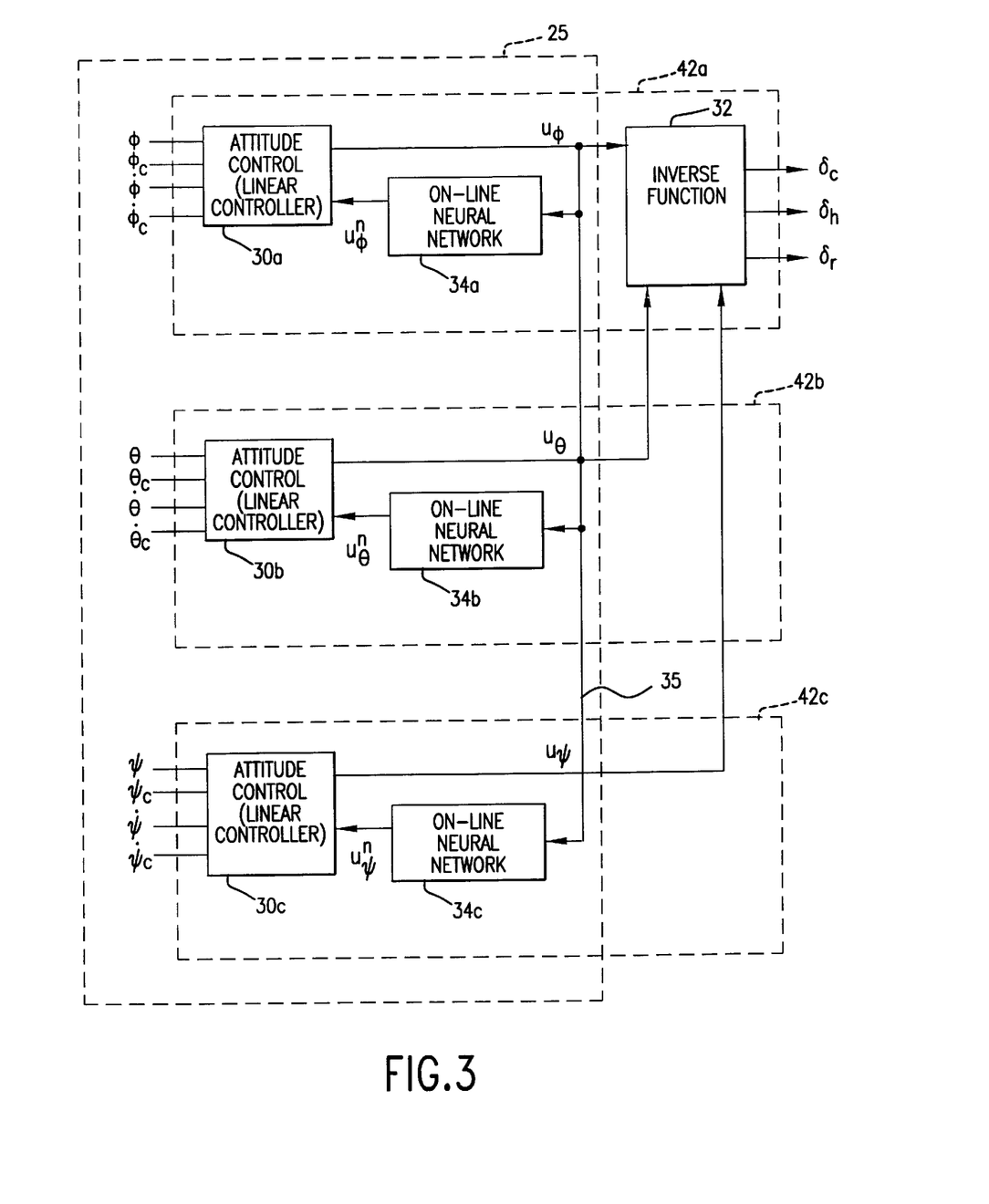
FIG. 3 is block diagram illustrating an adaptive control used in conjunction with a second control.

Referring to FIG. 3, a more detailed block diagram of the components of the adaptive control 25 for the system with multiple degrees of freedom is shown. The adaptive control 25 of the flight control computer system 10 forms part of control network 42a, control network 42b and control network 42c for the inverse model. Each network 42a, 42b, and 42c has the inverse function 32 for the respective degrees of freedom, $\phi$, $\Theta$, and $\psi$.

The adaptive control 25 consists of the attitude controllers 30a, 30b, and 30c and the neural networks 34a, 34b, and 34c for providing signals to the inverse function 32, respectively. The neural networks may be coupled by the connection line 35 as described in more detail in connection with FIG. 4B. The adaptive control 25 may employ each of the neural networks 34a, 34b, and 34c to define the architecture for pseudo control signal u that is input the inverse function 32. The output of each of the neural networks 34a, 34b, and 34c modifies the linear output of the attitude controllers 30a, 30b, and 30c which corresponds to the neural networks 34a, 34b, and 34c, respectively. Entering the attitude controller 30a is a measured roll value $\phi$ and a command roll value $\phi_c$ as well as the respective first derivatives of these values $\dot{\phi}$ and $\dot{\phi}_c$. The derivative $\dot{\phi}_c$ and other command derivatives indicated herein are obtained by from the command transformation unit 22 of FIG. 2 as discussed above. The inputs to the attitude controller 30b are a measured pitch value $\theta$ and a command pitch value $\theta_c$, and the respective first derivatives of these values $\dot{\theta}$ and $\dot{\theta}_c$. The inputs to the attitude controller $30_c$, are a measured yaw value $\Psi$ and a command $\Psi_c$ and the respective first derivatives of these values $\dot{\Psi}$ and $\dot{\Psi}_c$. The measured values are based on values actually measured by the IMU 17 (FIG. 1) on board the aircraft 11.

Figure 4A:
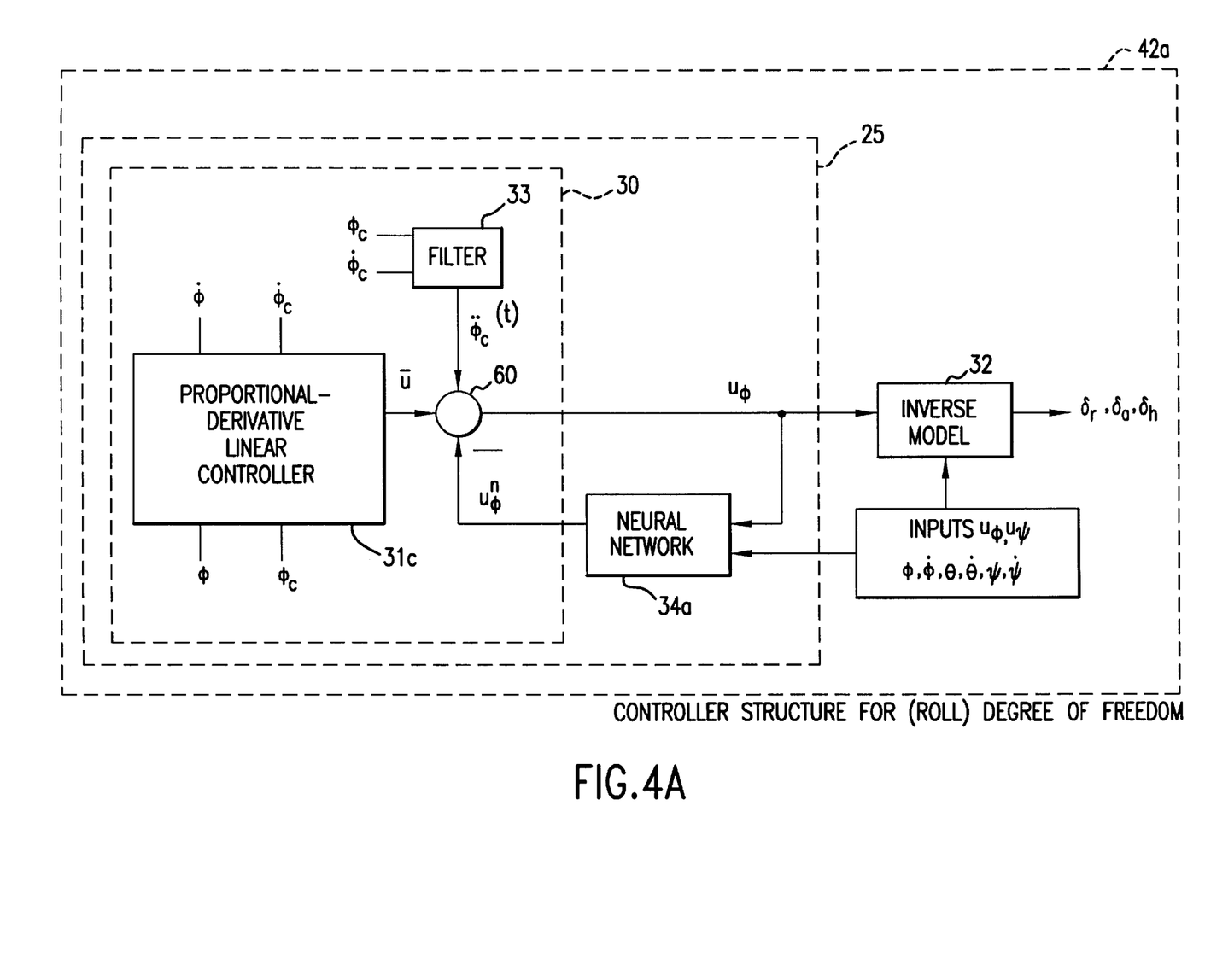
FIGS. 4A and 4B are block diagrams showing further details of a control component illustrated in FIG. 3.

Referring to FIG. 4a, a more detailed view of the network 42a is shown. FIG. 4a shows a node 60 which is used to create the pseudo vector $u_\phi$, as modified by the utilization of the neural network 34a of the present invention. At the node 60, the output of a proportional-derivative linear controller 31c $\bar{u}_\phi$, is added to the second derivative $\ddot{\phi}_c$, of the control signal $\phi$, the sum of which is then subtracted by the output of the neural network $u''\phi$. From node 60, it can be seen that $u\phi$ depends on $u''\phi$. That is, the current input of the networks 34a is a function of its current output. This process may be termed an iterative or recursive process, which gives rise to the need for a fixed point solution as discussed herein. The second derivative $\ddot{\phi}_c$ indicated herein is obtained by digitally filtering the signals $\phi$ and $\dot{\phi}_c$ through filter 33. The output $u''\phi$ of the neural network 34a serves to correct for the nonlinearities that are learned during on-line processing of actual flight control data. The implementation of the neural network 34a thus enables the present invention to provide more accurate output controls δ for a modeled system. The inputs to the neural network 34c, as well as to the inverse function 32 are $\theta$, $\dot{\theta}$, $\Psi$, $\dot{\Psi}$, $\phi$, $\dot{\phi}$, $u_\psi$, and $u_\Theta$. The generalized detail for calculating the appropriate values for each of the networks 42a, 42b, and 42c are shown and described in connection with FIG. 4B.

Figure 4B:
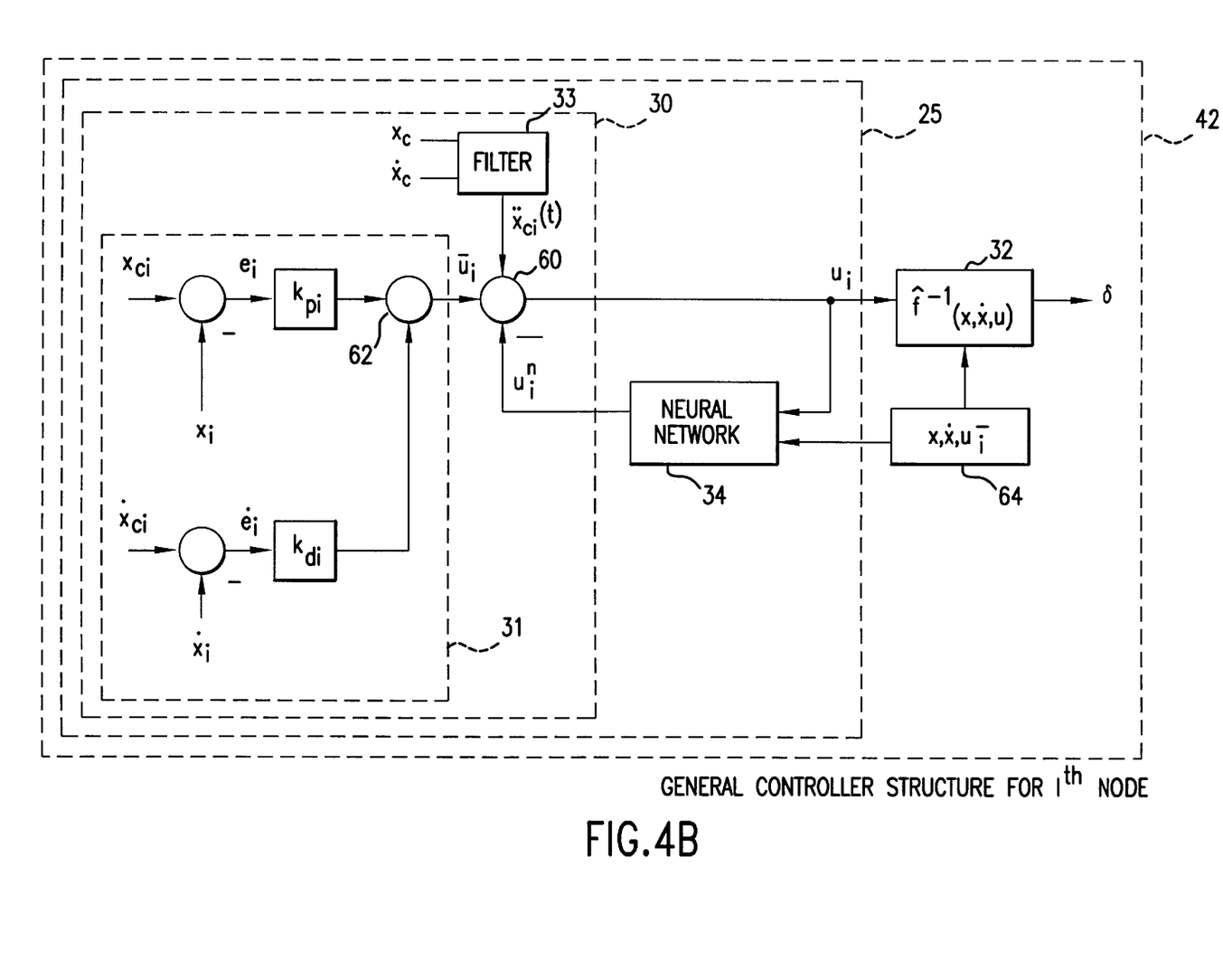

Referring to FIG. 4B, x is used as a generalized symbol for each degree of freedom, in this example $\Psi$, $\phi$, or $\Theta$. It should be appreciated that more degrees of freedom may be used with the present invention than those illustrated and discussed in connection with the figures above. The functions, processes and operations of the elements of FIG. 4B are given by the equations and discussion below. The discussion in connection with FIGS. 4B and 5 may apply to any system which uses an on-line adaptive controller for learning and processing data in real time.

As noted above, a nonlinear control system may be designed, using techniques known by those skilled in art, where the process dynamics of the actual system can be characterized by the equation:

$$\text{Actual System } \ddot{x} = f(x, \dot{x}, \delta) \quad \text{(Eq. 1)}$$

where the vectors x and $\dot{x}$ make up the elements of the state 10 vector, and $\delta$ is the control vector, all being of equal dimension (n). The vector x is generally a measured value such as $\Phi$, $\Theta$, and $\Psi$ discussed above. The dimension (n) is referred to as the number of degrees of freedom, and a subscript i=1 ... n will be used to denote the $i^{th}$ degree of freedom, corresponding to the $i^{th}$ element in the vector x. In the example discussed above, n=3 to represent the three degrees of freedom $\Phi$, $\Theta$, and $\Psi$. A model of the actual system may be represented by the following equation:

$$\text{Model } \ddot{x} = \hat{f}(x, \dot{x}, \delta) \quad \text{(Eq. 2)}$$

A well known method of controlling nonlinear systems of this form when the nonlinear function $f(x,\dot{x},\delta)$ is known is based on state feedback inversion. State feedback inversion entails designing a so-called pseudo state feedback control, $u(x,\dot{x},)$, as a linear controller, such as controllers 31 in FIGS. 4A and 4B and then inverting the nonlinear function f so that $\delta$ can be computed once u is determined, such as the inverse function 32. Notationally, the inversion function can be expressed as $$\delta = \hat{f}^{-1}(x, \dot{x}, u) \quad \text{(Eq. 3)}$$

where $\hat{f}^{-1}(x,\dot{x},\delta)$ is the inverse of the model $\hat{f}(x,\dot{x},\delta)$ of the actual nonlinear function $f(x,\dot{x},\delta)$. When the function $f(x,\dot{x},\delta)$ is poorly modeled, or when the system being controlled undergoes a rapid or unexpected change, then the above procedure for using the inverse of a model is inadequate for practical applications. However, the present invention utilizes an adaptive controller such as an adaptive controller 25 (FIG. 24B) that employs a neural network 34 in defining the architecture for the pseudo control $u_i(x,\dot{x})$. The pseudo control $u_i(x,\dot{x})$ used in controlling the $i^{th}$ degree of freedom may be represented by equation 4 in the following form:

$$u_i(x, \dot{x},) = \bar{u}_i(x, \dot{x}_i) + \ddot{x}_{ci}(t) - u_i^n(x, \dot{x}, u) \quad \text{(Eq. 4)}$$

where $\bar{u}_i(x_i, \dot{x}_i)$ is the output of a linear controller 31 designed for the linear system $\ddot{x}_i = \bar{u}_i$, $x_{ci}(t)$ is the command signal for $i^{th}$ degree of freedom, and $u_i^n(x,\dot{x},u)$ is the output of a neural network 34. The pseudo control $u_i(x,\dot{x})$ is calculated at node 60 in FIG. 4. The architecture and processes of $u_i^n(x,\dot{x},u)$ are defined by equation 5:

$$u_i^n(x, \dot{x}, u) = \sum_j w_{i,j}(t) \beta_{i,j}(x, \dot{x}, u) \quad \text{(Eq. 5)}$$

where $w_{i,j}$ is the connection weight for the $i^{th}$ degree of freedom and j represents the number of elements for each degree of freedom. It should be appreciated that the number of elements j may vary for each degree of freedom according to the designer's specifications.

The $u_i^-$ input of inputs 64 to the neural network 34 represents all u vectors except the $u_i$ vector for which the control signal is being determined.

Many approaches known in the art exist for defining 5 the linear part of the controller 31. For the purposes of the discussion herein, it will be assumed that the linear controller 31 has the so-called "proportional+derivative" form:

$$\bar{u}_i(t) = k_{pi}[x_i(t) - x_{ci}(t)] + k_{di}[\dot{x}_i(t) - \dot{x}_{ci}(t)] \quad \text{(Eq. 6)}$$

as processed at node 62. It should be appreciated that other processes or forms can be equally treated for a linear controller within the context of the present invention. For this choice of linear control, the connection weights $w_{i,j}(t)$ are adjusted on-line and in real time according to the following weight adjustment process:

$$\dot{w}_{i,j} = -\gamma_i [e_i/2k_{pi} + \dot{e}_i(1 + 1/k_{pi})/2k_{di}] \beta_{i,j}(x, \dot{x}, u) \quad \text{(Eq. 7)}$$

where $e_i(t) = x_i(t) - x_{ci}(t)$ (i.e., the error value between the measured value $x_i(t)$ and command value $x_{ci}(t)$) and $\gamma_i$ is a constant learning rate. The weight adjustment processes are well known to those skilled in the art. The learning weight $\gamma_i$, as known by those skilled in the art, is chosen by the designer of the neural network. The learning weight determines how much a given input should effect the various connection weights of the system (i.e., the learning rate of the system). Because the weight adjustment process or equation is given in terms of the first derivative of the connection weight values $w_{i,j}(t)$, only a bank of analog or digital integrators, for these weight values $w_{i,j}(t)$, is needed for the on-line adjustment of the neural network weights as given by Eq. 7.

The gain constants $k_{pi}$ (proportional constant) and $k_{di}$ (derivative constant) may be chosen by techniques known to those skilled in the art familiar with proportional/derivative control. There is considerable latitude in designing the particular manner in which the gains $k_{pi}$ and $k_{di}$ enter the weight adjustment process. In all cases, the basic form of the weight adjustment process remains similar that shown in Eq. 7. Having determined the pseudo control vector u, the real control $\delta(t)$ is then computed using the approximate inverse function $\delta = \hat{f}^{-1}(x,\dot{x},u)$.

One skilled in the art is provided a wide latitude in selecting the basis functions $\beta_{i,j}(x,\dot{x},u)$. In general, $\beta_{i,j}(x,\dot{x},u)$ should be chosen so that the neural network 34 corrects for the differences between $\hat{f}(x,\dot{x},u)$ and the actual, but unknown inverse function $\hat{f}^{-1}(x,\dot{x},u)$. In the absence of any additional information concerning these differences, polynomial functions of x, $\dot{x}$ and u may be employed. Such polynominal functions, as known to those skilled in the art, are described in Kim, B. S. and Calise, A. J., "Nonlinear Flight Control Using Neural Networks," AIAA Guidance, Navigation, and Control Conference, Paper #94-3646, AZ, Aug. 1–3, 1994 which is herein incorporated by reference. In any case, some provision should be made for the fact that whatever set of basis functions is selected, perfect correction can rarely be achieved, and under these circumstances a dead zone, as known by those skilled in the art, is employed to deactivate the weight adjustment process, as given in Eq. 7, when a positive scalar function of the tracking errors $e_i(t)$ and $\dot{e}(t)$ is below a specified level. The dead zone feature is used in a stability proof to insure that the tracking errors remain bounded and ultimately reach and remain on the boundary of the dead zone. For a suitably comprehensive set of basis functions, the size of the dead zone can be reduced to near zero. The use of a dead zone in adaptive control is a well-known approach that is often employed as a part of a stability proof. The details regarding the stability proof and the design of a dead zone for this application may be found in Kim, B. S. and Calise, A. J., "Nonlinear Flight Control Using Neural Networks," AIAA Guidance, Navigation, and Control Conference, Paper #94-3646, AZ, Aug. 1–3, 1994.

Two advantageous features are presented by the architecture and processes implemented by the neural network 34. First, the neural network basis functions $\beta_{i,j}(x,\dot{x}, u)$ that shape the network outputs $u_i^n(t)$ are functions of the elements of $u(x,\dot{x})$. Therefore, the system is enabled to operate with systems that are nonlinear in the control. Since $u(t)$ depends on $u^n(t)$, it follows that the $i^{th}$ network input depends on the present outputs of all the networks. Therefore, a so-called fixed point solution is used to define the network 34 outputs. In order to determine the fixed point, a network is iterated until a fixed point solution is determined. A variety of well known approaches for calculating a fixed point solution, or to approximate its solution to within practical limits are known by those skilled in the art. The architecture for the neural networks 34 defined by this invention is illustrated in FIG. 5.

Figure 5:
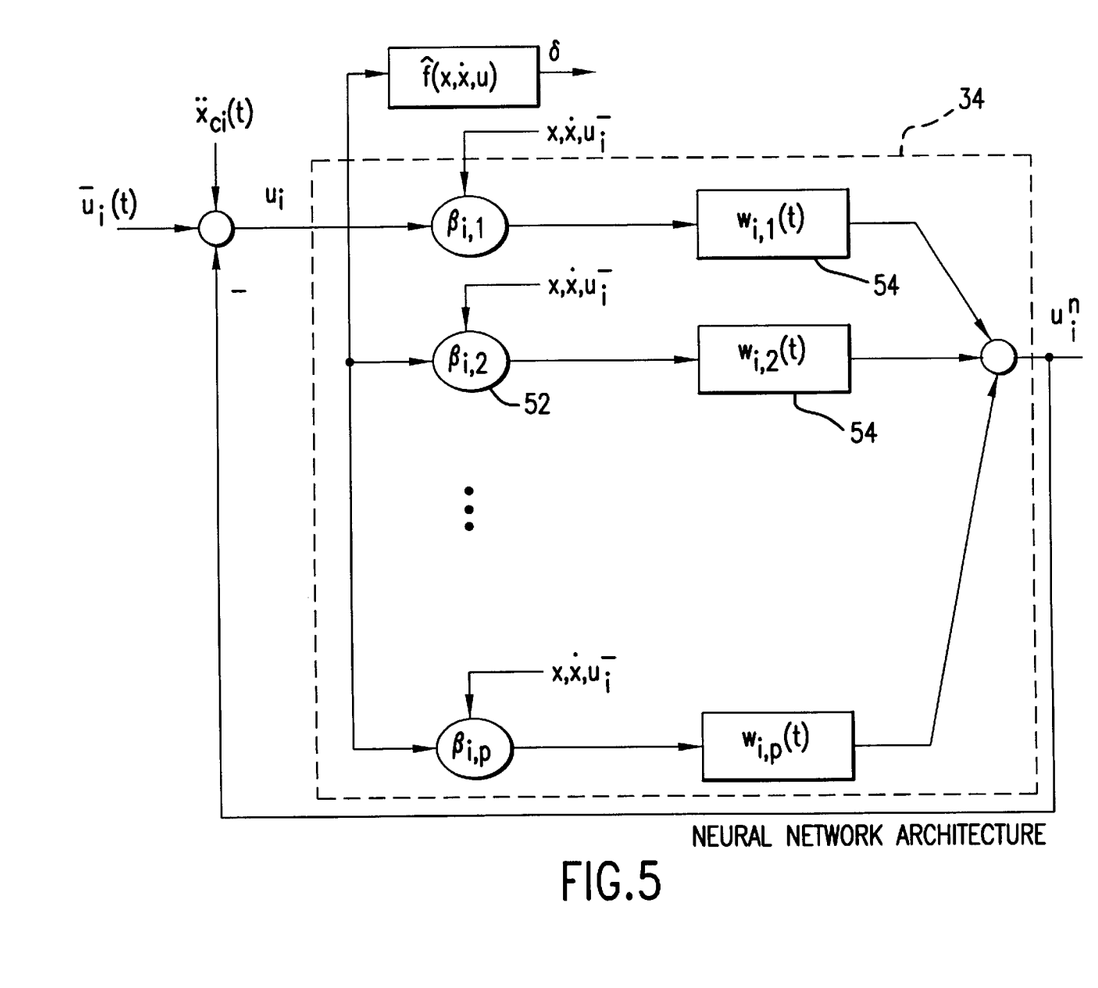
FIG. 5 is a block diagram of a neural network implemented as a component of the adaptive control.

Referring to FIG. 5, the inputs to the $i^{th}$ network consist of the pseudo control component $u_i$ together with all the other pseudo control components from the remaining (n−1) network architectures (denoted by $u_i^{31}$ in the FIG. 5), and the state vector consisting of x and $\dot{x}$. In some, applications it may be possible to decouple the networks to a simpler form in which the basis functions are restricted to the form $\beta_{i,j}(x, \dot{x}, u_i)$. Decoupling means that the pseudo control vector $u_i^-$ can be removed as an input to the $i^{th}$ network. An example presented below was implemented using the decoupling method. A second advantage is provided because the linear part of the pseudo control, $\overline{u}_i$, is modified by the $i^{th}$ network output $u_n^i$, to form $u_i$, which is then passed (as one of the input components) though the approximate inverse function $\hat{f}^{-1}(x,\dot{x},u)$ to determine the actual control, $\delta$. The structure is replicated for each degree of freedom (i=1 ... n) to construct all of the elements $u_i$ needed as inputs to $\hat{f}^{-1}(x,\dot{x},u)$. The realization of the neural network 34 may be accomplished either in analog or digital form. Moreover, a second network whose weights have been adjusted off-line may be employed to realize the approximate inverse function $\hat{f}^{-1}(x,\dot{x},u)$. When a second or off-line network or inverse function 32 in FIG. 3 is utilized, the architecture and method of training employed in designing the off-line network may be chosen by conventional methods known to those skilled in the art.

Figure 6:
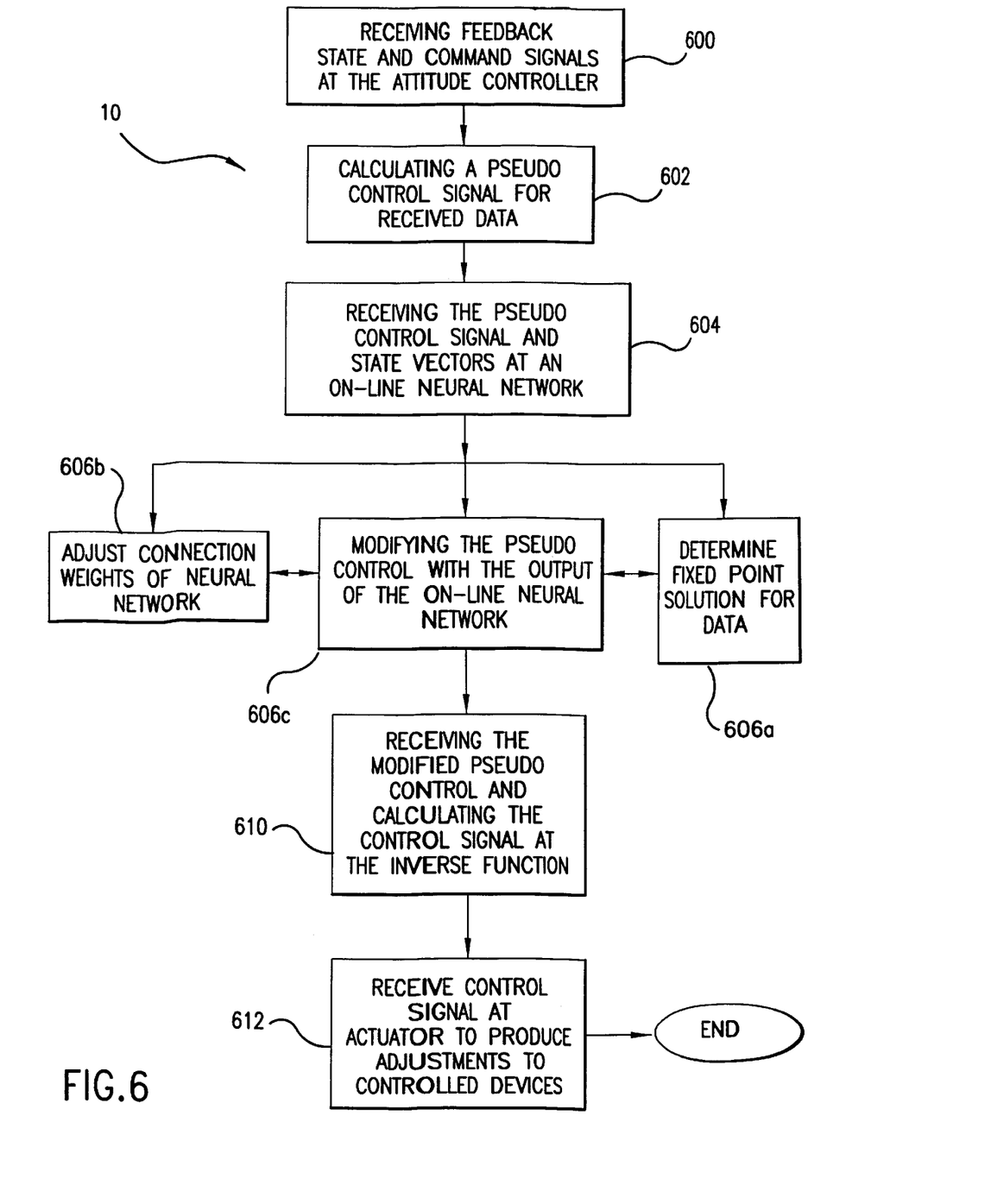
FIG. 6 is a flow diagram of the steps of the processes implemented according to the present invention.

Having discussed the steps of present invention in connection with the architecture of the system, the steps of present invention will be discussed generally in connection with the flow diagram of FIG. 6. The specific steps implemented in the preferred embodiment of the present invention are discussed in connection with FIGS. 2, 4, 5, and 6. The steps preferably are implemented as a computer-implemented routine in the flight control system. This program may reside in memory of the flight control computer system 12. Referring to FIG. 6, the steps for producing a control signal based on receipt of on-line data for a nonlinear aircraft system is discussed. At step 600, the state and command vectors that are fed back along path 29 and forward along paths 23 and 24 are provided to the attitude controller 30. At step 602, a linear pseudo control signal $\overline{u}$ is calculated for the data received during the process. At step 604, the state vectors and pseudo controls are received at the on-line neural network 34. After receipt of the input data at the neural network 34, a fixed point solution is calculated for the input at step 606a and the weight adjustment process occurs as indicated at step 606b. At step 606c, the neural network 34 modifies and corrects for inverse modeling errors as discussed above and provides a signal $u_i^n(t)$ that is used at the node 60 (FIGS. 4A and 4B) to calculate a modified pseudo control signal $u_i$. The process then proceeds to step 610. At step 610, the inverse response function 32, which is based on a model for the process, receives $u_i$ and computes the control signal $\delta$. The control signal $\delta$ is then transmitted to an output response device, such as synthetic jets or hydraulic actuator devices for controlling the moving surfaces of the aircraft 11. Such devices respond to the control signal $\delta$ to adjustment controlled devices, as indicated at step 612.

The following text discusses computer simulations implementing the present invention. High fidelity six degree of freedom computer simulations have been conducted to demonstrate the usefulness of the network processes and control architectures depicted in FIGS. 1–6. The results indicate that these architectures can offer an improved approach to flight control design that can tolerate large uncertainties in aerodynamic modeling and sudden failures in actuator channels.

Command Augmentation System (CAS) Design

Figure 7:
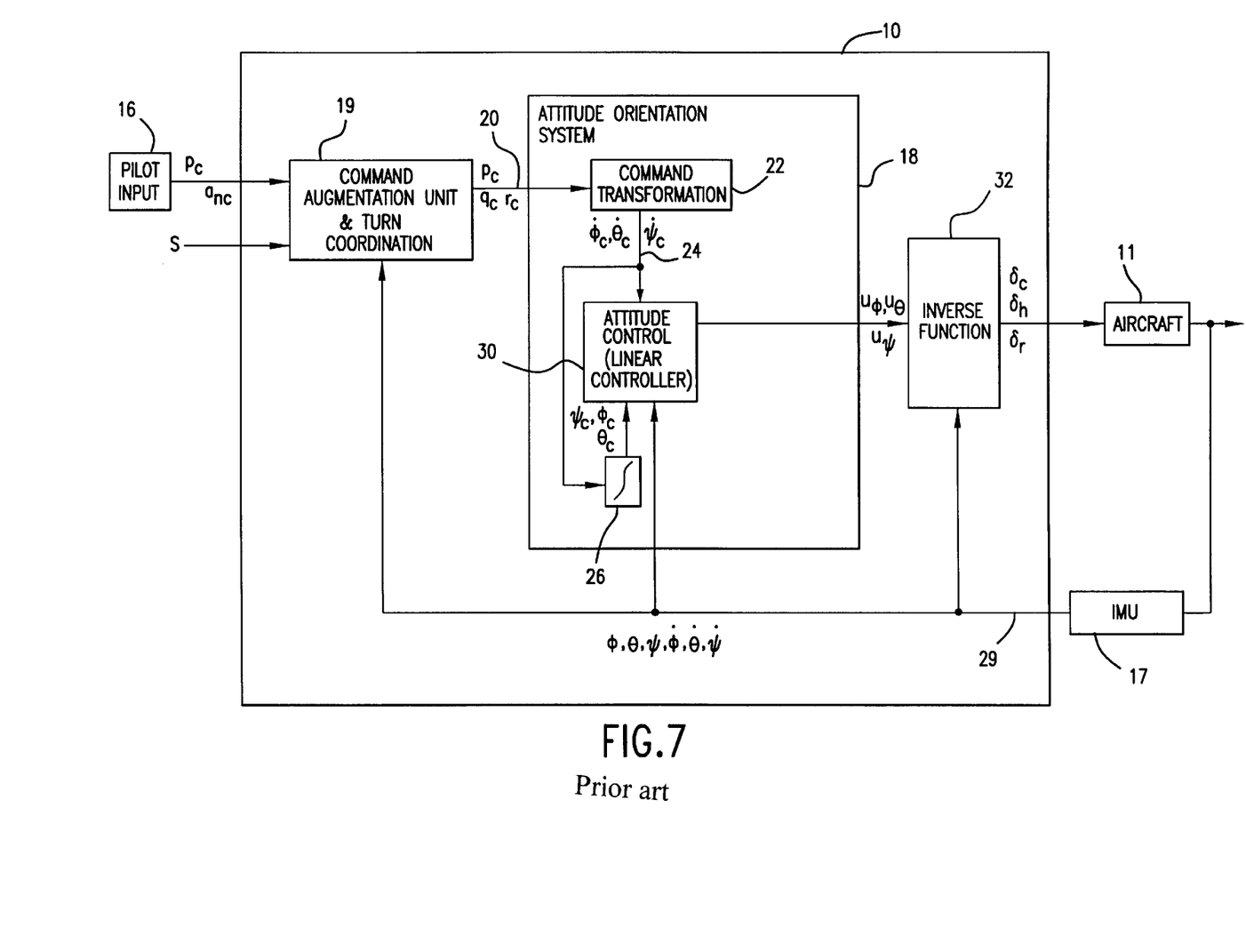
FIG. 7 is a prior art flight control system that does not provide adaptive control.

FIG. 7 depicts the architecture of a CAS design based on a conventional feedback linearization design. The structure and implementation of the design of FIG. 7 is more fully discussed in Menon, P. K., "Nonlinear Command Augmentation System for a High-Performance Aircraft," AIAA Guidance, Navigation, and Conference, Paper # 93-3777, Monterey, Calif., Aug. 9–13, 1993 which is herein incorporated by reference.

The structure of FIG. 7 uses an outer loop controller (command augmentation logic) to regulate the slower dynamics, consisting of translational dynamics. The outer loop generates body angular rate commands ($p_c$, $q_c$, and $r_c$) to the inner attitude control loop controller. The inner loop converts these commands to attitude rate commands, and uses an approximate inverse model to regulate the fast attitude dynamics. The pilot inputs to the CAS are chosen as roll rate command and normal acceleration command. The control variables are aileron and/or differential tail, elevator and rudder ($\delta_a$, $\delta_h$, $\delta_r$), which are used to control the three degrees of freedom in attitude. The CAS is required to stabilize the airframe while following normal acceleration and roll rate commands from the pilot. In addition to these functions, the CAS has responsibility for maintaining zero angle of sideslip during maneuvers.

Referring to FIG. 2, the role of neural networks in the architecture of FIG. 2 is divided into two functions: (1) an off-line designed network 32 that realizes the approximate inverse function for the inner loop, and (2) a second on-line network 34. The neural network 34 compensates for imperfect inversion and in-flight changes in the actual aircraft dynamics. The neural network 34 is trained on-line using the weight adjustment process of Equation 7. For this example, the neural network 32 was trained over a limited portion of the flight envelope, using aircraft aerodynamic and propulsive data.

Off-line Network Performance

Figure 8A:
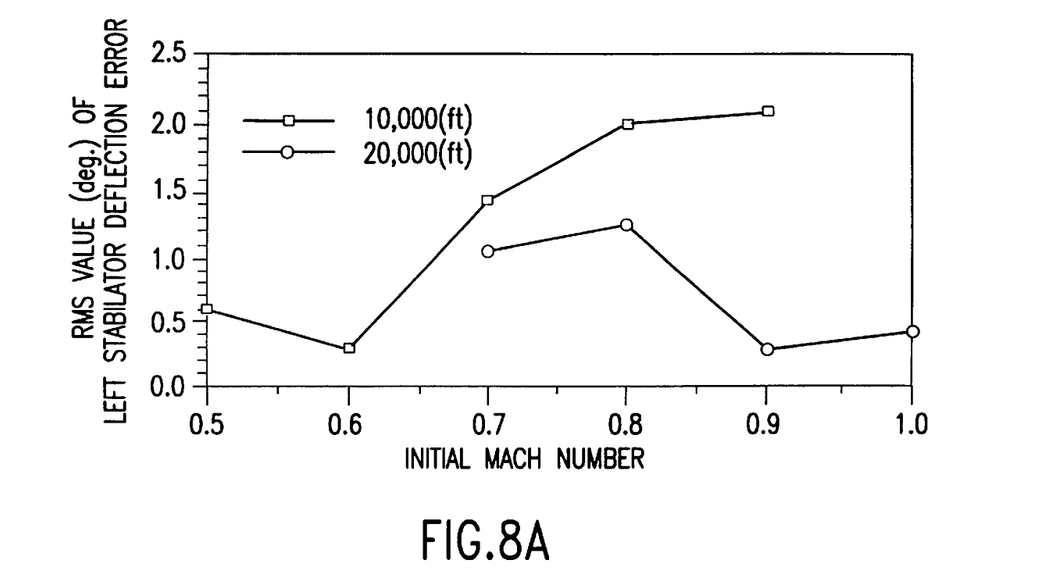
FIGS. 8A and 8B show sample data of a simulation of control errors using the flight control system of FIG. 6.
Figure 8B:
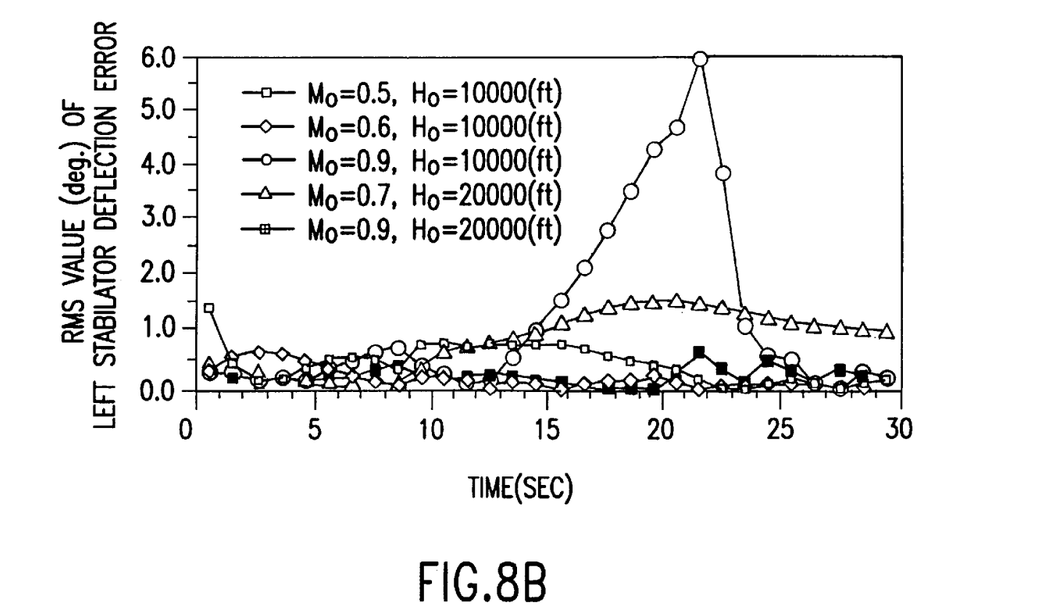

FIG. 8A illustrates statistical measures for the performance of the control process of FIG. 7 as implemented with an F18 aircraft. FIG. 7A shows the effect that initial altitude and Mach number have on the root mean square error of the network output 32b for a high g turn maneuver. The error is computed by comparison to the controls $\delta_a \delta_h \delta_r$ computed by using an off-line method of inverting the exact dynamics. It can be seen in FIG. 8A that for $h_o$=10,000 ft, the worst case root mean square error increases for both low and high initial Mach numbers. The increases for low and high initial Mach number occur because some portion of the flight is outside the off-line training envelope for the neural network 32b. For $M_o$=0.5 the starting Mach number lies below the training range, and for $M_o$=0.9 the Mach number exceeds the training range during the maneuver interval. A moving average of the rms error is illustrated in FIG. 8B that exhibits the effect as a function of time. Also consider the maneuver initiated at $M_o$=0.7 and $h_o$=20,000 ft. The example maneuver exhibits a large rms error that is sustained over the last 20 seconds of flight. Over this portion of the trajectory the Mach number is nearly constant and near 1.0. Although this lies within the training range, it corresponds to a region where the errors were larger than average due to the more complex variation that the aerodynamic data exhibits near Mach 1. That is, an off-line trained network 32 with weights trained to provide good average performance over a given envelope of data can exhibit large errors within a portion of the envelope that has a high degree of complexity in its mapping.

On-line Network Performance

Figure 9A:
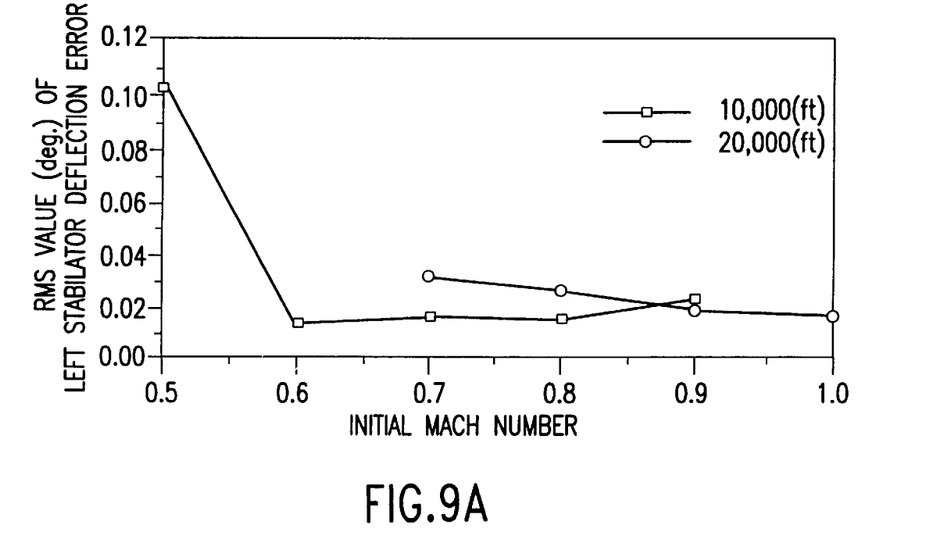
FIGS. 9A and 9B show sample data of a simulation of control errors using the flight control system of FIG. 2.
Figure 9B:
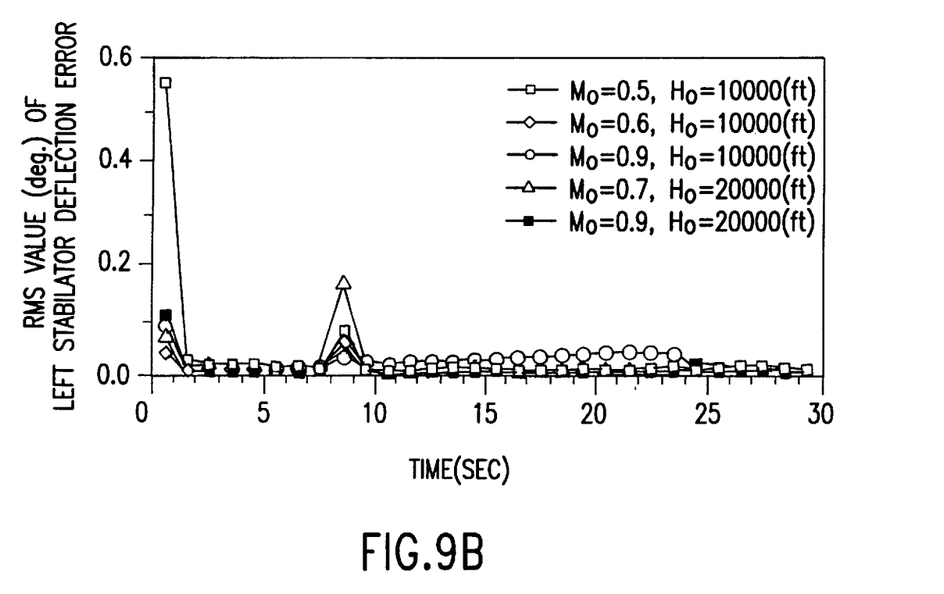

FIGS. 9A and 9B illustrate the statistical measures for the performance of a system that implements the neural network structures 32 and 34 as discussed above. Note that the rms errors in FIG. 9A are an order of magnitude lower than those of FIG. 8A. FIG. 9B (moving average results) shows that the errors are of extremely short duration in comparison to FIG. 8B. For example, when $M_o$=0.5, and $h_o$32 10000 ft, the result initially starts outside the neural network 32 training envelope, which is the cause for the high initial error. However, the initial error exhibited in FIG. 8B is rapidly reduced by the on-line weight adjustment process used in FIG. 2 as the results of FIG. 8B illustrate. Likewise when $M_o$32 0.7, and $h_o$=20000 ft, the result shows that errors exhibited in a network of FIG. 8B in the transonic region are rapidly reduced by use of the neural network 34 of FIG. 2. The errors at approximately 8 seconds correspond to the initiation of the high g maneuver. These results show the potential for rapid adaptation using the on-line architectures discussed in connection with FIGS. 1–5 in combination with the online process for weight adjustment given in Equation 7.

The foregoing relates to the preferred embodiment of the present invention, and many changes may be made therein without departing from the scope of the invention as defined by the following claims.

We claim:

1. A computer system for controlling a nonlinear physical process with a dynamic output response signal, said physical process represented by a fixed model of said process, comprising:

a linear controller for providing a pseudo control signal, said pseudo control signal being based on said fixed model for said process;

a second adaptive controller, connected to said linear controller, for receiving said pseudo control signal and for providing a modified pseudo control signal to said linear controller to correct for errors inherent in modeling of said process, said second adaptive controller comprising a neural network for modifying said pseudo control signal based on on-line analysis of said process, the value of said modified pseudo control signal equals the sum of said pseudo control signal, outputted from said linear controller, and an estimated derivative of a received command signal for a degree of freedom in said system, the sum being subtracted by an output signal from said neural network for that same degree of freedom; and a response network, connected to said second controller, for receiving said modified pseudo control signal and for providing said output response signal to a controlled device.

2. The computer system of claim 1 wherein the controlled device comprises a moving surface controlled by a hydraulic actuator based on the output response signal.

3. The computer system of claim 1 wherein the controlled device comprises a moving surface controlled by an electrical actuator based on the output response signal.

4. The computer system of claim 1 wherein the controlled device comprises a surface receiving airflow from a plurality of synthetic jets based on the output response signal.

5. A method for providing a control signal to a controlled device in a modeled dynamic non-linear process in which data is received on-line for a non-linear system, comprising the steps of:

receiving feedback state and command signals at a controller;

calculating a pseudo control signal for the received feedback state and command signals;

receiving the pseudo control signal and state signal at an online neural network that is adapted to correct for errors inherent in the modeling of the non-linear physical process;

calculating a fixed point solution at the neural network to ensure stability of the process;

adjusting connection weights of the neural network based on the state and command signals received;

modifying, at the neural network, the pseudo control signal with an output signal of the on-line neural network to correct for inverse modeling errors;

producing a modified pseudo control signal as an output from said neural network;

receiving the modified pseudo control signal and calculating an inverse response control signal at an inverse response function unit that is based on a model for the process; and transmitting the inverse response control signal to an output response device for producing adjustments to the controlled device.

6. The method of claim 5 wherein the output response device comprises a hydraulic actuator device for moving the controlled device that comprises a moving surface of an aircraft based on the output response signal.

7. The method of claim 5 comprising the step of calculating said modified pseudo control signal by adding an output signal of said controller and a received control signal for a degree of freedom in said system to form a sum signal, and subtracting said sum signal by an output signal of said neural network.

8. The method of claim 5 wherein the output response device comprises an electrical actuator for moving a controlled device that comprises a surface of an aircraft based on the output response signal.

9. The method of claim 5 wherein the output response device comprises a plurality of synthetic jets for modifying airflow over a controlled device that comprises a surface of an aircraft based on the output response signal.

10. A computer system for controlling the dynamic output response of a nonlinear physical process, said physical process represented by a fixed model of said process, comprising:

a linear controller for providing a pseudo control signal, said pseudo control signal being based on said fixed model for said process;

a second controller, connected to said linear controller, for receiving said pseudo control signal and for providing a modified pseudo control signal to correct for errors inherent in modeling of said process, said second controller comprising a neural network for modifying said pseudo control signal based on on-line data training of said neural network, the value of said modified pseudo control signal equals the sum of value of the output of said linear controller and the value of an estimated derivative of a received command signal for a degree of freedom in said system subtracted by the value of the output of said neural network for that same degree of freedom; and a response network, connected to said second controller, for receiving said modified pseudo control signal and for providing an output response signal to a controlled device.

11. The computer system of claim 10 wherein the controlled device comprises a moving surface controlled by a hydraulic actuator based on the output response signal.

12. The computer system of claim 10 wherein the controlled device comprises a moving surface controlled by an electrical actuator based on the output response signal.

13. The computer system of claim 10 wherein the controlled device comprises a surface receiving a modified airflow from a plurality of synthetic jets based on the output response signal.

14. A method for providing a control signal to an actuator device for controlling an aircraft in a modeled dynamic non-linear process in which data is received on-line for a non-linear system, comprising the steps of:

receiving feedback state and command signals at a controller;

calculating a pseudo control signal for the received feedback state and command signals;

receiving the pseudo control signal and state signal at an online neural network that is adapted to correct for errors inherent in the modeling of the non-linear physical process;

calculating a fixed point solution at the neural network to ensure stability of the process;

adjusting connection weights of the neural network based on the state and command signals received;

modifying, at the neural network, the pseudo control signal with the output of the on-line neural network to correct for inverse modeling errors;

producing a modified pseudo control signal as an output from said neural network by adding the value of the output of said linear controller and the value of a received control signal for a degree of freedom in said system to form a sum, and subtracting said sum by the value of the output of said neural network;

receiving the modified pseudo control signal and calculating an inverse response control signal at an inverse response function unit that is based on a model for the process; and transmitting the inverse response control signal to said actuator device.

15. The method of claim 14 wherein the actuator device comprises a hydraulic actuator.

16. The method of claim 14 wherein the actuator device comprises an electrical actuator.

17. The method of claim 14 wherein the actuator device comprises a plurality of synthetic jets.

* * * * *